(12) United States Patent
Otanez et al.

(10) Patent No.: US 8,855,878 B2
(45) Date of Patent: Oct. 7, 2014

(54) SYSTEM AND METHOD FOR CONTROLLING AN ACCUMULATOR BASED ON VEHICLE CONDITIONS

(75) Inventors: Paul G. Otanez, Troy, MI (US); Zhen J. Zhang, Canton, MI (US)

(73) Assignee: GM Global Technology Operations, LLC., Detroit, MI (US)

( * ) Notice: Subject to any disclaimer, the term of this patent is extended or adjusted under 35 U.S.C. 154(b) by 149 days.

(21) Appl. No.: 13/570,438

(22) Filed: Aug. 9, 2012

(65) Prior Publication Data

US 2014/0046553 A1 Feb. 13, 2014

(51) Int. Cl.
*F16H 61/06* (2006.01)

(52) U.S. Cl.
USPC ............ 701/58; 701/65; 701/66; 477/50; 477/150; 477/174

(58) Field of Classification Search
CPC ... F16H 61/6648; F16H 61/06; F16H 61/067; F16H 61/08; F16H 61/068; F16H 61/4008; F16H 61/4017; F16H 2061/0021; F16H 2061/0034; F16H 2061/0037; B60R 16/08; B60W 10/023; B60W 10/04; B60W 2510/0225; B60W 30/1888; B60W 40/02; B60W 2030/18; Y02T 10/48
USPC ........ 701/51, 53, 58, 65, 66; 477/34, 50, 150, 477/173, 174
See application file for complete search history.

(56) References Cited

U.S. PATENT DOCUMENTS

| | | | |
|---|---|---|---|
| 4,372,414 A * | 2/1983 | Anderson et al. | 180/165 |
| 4,813,510 A * | 3/1989 | Lexen | 180/165 |
| 4,959,962 A * | 10/1990 | Hagin et al. | 60/626 |
| 5,034,892 A * | 7/1991 | Saotome | 701/50 |
| 5,662,188 A * | 9/1997 | Ito et al. | 184/6.3 |
| 6,719,080 B1 * | 4/2004 | Gray, Jr. | 180/165 |
| 8,056,666 B2 * | 11/2011 | Portell et al. | 180/165 |
| 8,075,002 B1 * | 12/2011 | Pionke et al. | 280/5.5 |
| 8,246,511 B2 * | 8/2012 | Ohashi et al. | 477/38 |
| 8,567,444 B2 * | 10/2013 | Marin et al. | 138/31 |
| 8,596,294 B2 * | 12/2013 | Otanez et al. | 137/455 |
| 8,639,424 B2 * | 1/2014 | Lundberg et al. | 701/54 |
| 2010/0093488 A1 * | 4/2010 | Portell et al. | 477/52 |
| 2011/0088990 A1 * | 4/2011 | Shimizu et al. | 192/85.01 |
| 2012/0085450 A1 * | 4/2012 | Marin et al. | 138/31 |
| 2012/0088631 A1 * | 4/2012 | Zhang et al. | 477/52 |
| 2012/0270702 A1 * | 10/2012 | Ohashi et al. | 477/175 |

* cited by examiner

*Primary Examiner* — Russell Frejd

(57) ABSTRACT

A system and method for controlling an accumulator in a transmission of a motor vehicle includes the steps of determining whether the motor vehicle has been turned off, sensing at least one operating condition of the motor vehicle, and comparing the at least one operating condition to a reference condition. If the at least one operating condition of the motor vehicle fulfills the reference condition and if the motor vehicle has been turned off then the accumulator is discharged.

14 Claims, 4 Drawing Sheets

SYSTEM AND METHOD FOR CONTROLLING AN ACCUMULATOR BASED ON VEHICLE CONDITIONS

FIELD

The present disclosure relates to a system and method for controlling an accumulator in a hydraulic control system of a motor vehicle, and more particularly to a system and method for controlling the discharge of an accumulator based on measured transmission conditions within a motor vehicle.

BACKGROUND

The statements in this section merely provide background information related to the present disclosure and may or may not constitute prior art.

A typical automatic transmission includes a hydraulic control system that, among other functions, is employed to actuate a plurality of torque transmitting devices and to provide lubrication and cooling to the components of the transmission. The conventional hydraulic control system typically includes a main pump that provides a pressurized fluid, such as automatic transmission oil, to a plurality of valves and solenoids within a valve body. The main pump is driven by the engine of the motor vehicle. The valves and solenoids are operable to direct the pressurized hydraulic fluid through a hydraulic fluid circuit to the components of the transmission. For example the pressurized hydraulic fluid delivered to the torque transmitting devices is used to engage or disengage the devices in order to obtain different gear ratios.

In order to increase the fuel economy of motor vehicles, it is desirable to stop the engine during certain circumstances, such as when stopped at a red light or idling. However, during this automatic stop, the pump is no longer driven by the engine. Accordingly, hydraulic fluid pressure within the hydraulic control system drops. This leads to clutches and/or brakes within the transmission to be fully disengaged. As the engine restarts, these clutches and/or brakes may take time to reengage fully, thereby producing slippage and delay between engagement of the accelerator pedal or release of the brake and the movement of the motor vehicle. One solution is to include an accumulator to pressurize the transmission at the start of an auto-start event. However in certain configurations the accumulator and the fluid stored within the accumulator are exposed to ambient temperature conditions and therefore may not be at the same temperature as the transmission during an engine start event after prolonged exposure. Therefore, there is a need in the art for a system and method for controlling the discharge of an accumulator that preserves the ability to perform engine stop-start events without affecting transmission operating performance.

SUMMARY

A system and method for controlling an accumulator in a transmission of a motor vehicle is provided. The method includes the steps of determining whether the motor vehicle has been turned off, sensing at least one operating condition of the motor vehicle, comparing the at least one operating condition to a reference condition, and discharging the accumulator if the motor vehicle has been turned off and if the at least one operating condition of the motor vehicle fulfills the reference condition.

In one aspect of the present invention the at least one operating condition is a temperature of a hydraulic fluid within the transmission, and the reference condition is a temperature range defined by a lower threshold and an upper threshold.

In another aspect of the present invention the at least one operating condition is a temperature of ambient air, and the reference condition is a temperature range defined by a lower threshold and an upper threshold.

In another aspect of the present invention the at least one operating condition is a pressure of a hydraulic fluid within the transmission, and the reference condition is a pressure range defined by a lower threshold and an upper threshold.

In another aspect of the present invention the at least one operating condition is a time value measured from a key off event, and the reference condition is a time range defined by a lower threshold and an upper threshold.

In another aspect of the present invention the at least one operating condition is one or more sensed conditions of the motor vehicle, and the reference condition is one or more conditions indicative of service being performed on the motor vehicle.

In another aspect of the present invention determining whether the motor vehicle has been turned off includes sensing a key off event by an operator of the motor vehicle.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
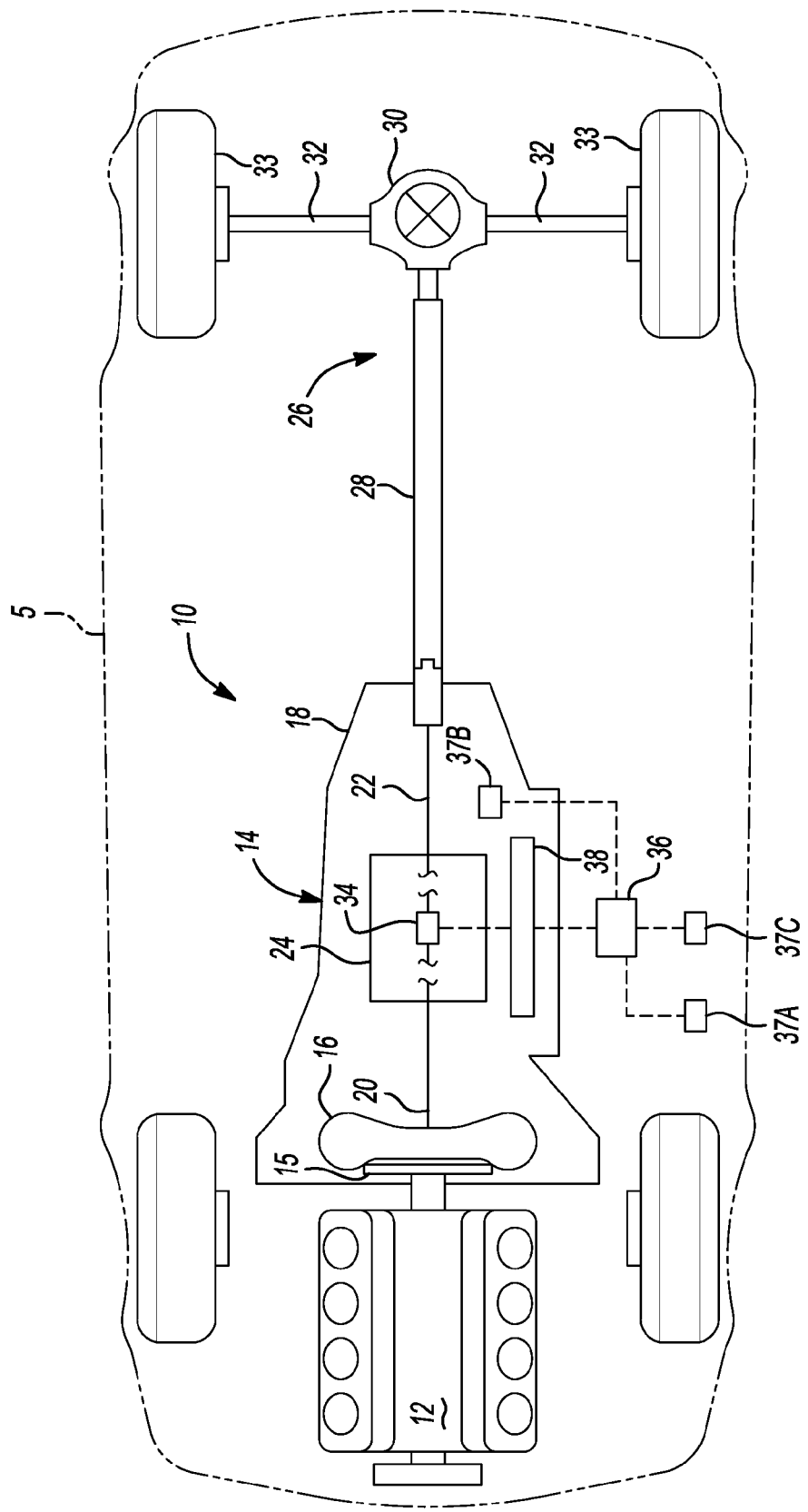
FIG. 1 is a schematic diagram of an exemplary powertrain in a motor vehicle.

With reference to FIG. 1, a motor vehicle is shown and generally indicated by reference number 5. The motor vehicle 5 is illustrated as a passenger car, but it should be appreciated that the motor vehicle 5 may be any type of vehicle, such as a truck, van, etc. The motor vehicle 5 includes an exemplary powertrain 10. It should be appreciated at the outset that while a rear-wheel drive powertrain has been illustrated, the motor vehicle 5 may have a front-wheel drive powertrain without departing from the scope of the present invention. The powertrain 10 generally includes an engine 12 interconnected with a transmission 14.

The engine 12 may be a conventional internal combustion engine or an electric engine, or any other type of prime mover, without departing from the scope of the present disclosure. The engine 12 supplies a driving torque to the transmission 14 through a flexplate 15 or other connecting device that is connected to a starting device 16. The starter device 16 may be a hydrodynamic device, such as a fluid coupling or torque converter, a wet dual clutch, or an electric motor. It should be appreciated that any starting device between the engine 12 and the transmission 14 may be employed.

The transmission 14 includes a typically cast, metal housing 18 which encloses and protects the various components of the transmission 14. The housing 18 includes a variety of apertures, passageways, shoulders and flanges which position and support these components. Generally speaking, the transmission 14 includes a transmission input shaft 20 and a transmission output shaft 22. Disposed between the transmission input shaft 20 and the transmission output shaft 22 is a gear and clutch arrangement 24. The transmission input shaft 20 is functionally interconnected with the engine 12 via the starting device 16 and receives input torque or power from the engine 12. Accordingly, the transmission input shaft 20 may be a turbine shaft in the case where the starting device 16 is a hydrodynamic device, dual input shafts where the starting device 16 is dual clutch, or a drive shaft where the starting device 16 is an electric motor. The transmission output shaft 22 is preferably connected with a final drive unit 26 which includes, for example, propshaft 28, differential assembly 30, and drive axles 32 connected to wheels 33. The transmission input shaft 20 is coupled to and provides drive torque to the gear and clutch arrangement 24.

The gear and clutch arrangement 24 includes a plurality of gear sets, a plurality of clutches and/or brakes, and a plurality of shafts. The plurality of gear sets may include individual intermeshing gears, such as planetary gear sets, that are connected to or selectively connectable to the plurality of shafts through the selective actuation of the plurality of clutches/brakes. The plurality of shafts may include layshafts or countershafts, sleeve and center shafts, reverse or idle shafts, or combinations thereof. The clutches/brakes, indicated schematically by reference number 34, are selectively engageable to initiate at least one of a plurality of gear or speed ratios by selectively coupling individual gears within the plurality of gear sets to the plurality of shafts. It should be appreciated that the specific arrangement and number of the gear sets, clutches/brakes 34, and shafts within the transmission 14 may vary without departing from the scope of the present disclosure.

The motor vehicle 5 includes a control module 36. The control module 36 may be a transmission control module (TCM), an engine control module (ECM), or a hybrid control module, or any other type of controller. The control module 36 is preferably an electronic control device having a preprogrammed digital computer or processor, control logic, memory used to store data, and at least one I/O peripheral. The control logic includes a plurality of logic routines for monitoring, manipulating, and generating data. The control module 36 controls the actuation of the clutches/brakes 34 via a hydraulic control system 38. The hydraulic control system 38 is operable to selectively engage the clutches/brakes 34 by selectively communicating a hydraulic fluid to the clutches/brakes 34 that engages the clutches/brakes 34. The control module 36 is also in communication with a plurality of sensors located throughout the motor vehicle 5. For example, the control module 36 communicates with an ambient temperature sensor 37A, a transmission fluid temperature sensor 37B, and an ignition key sensor 37C, to name but a few.

Figure 2:
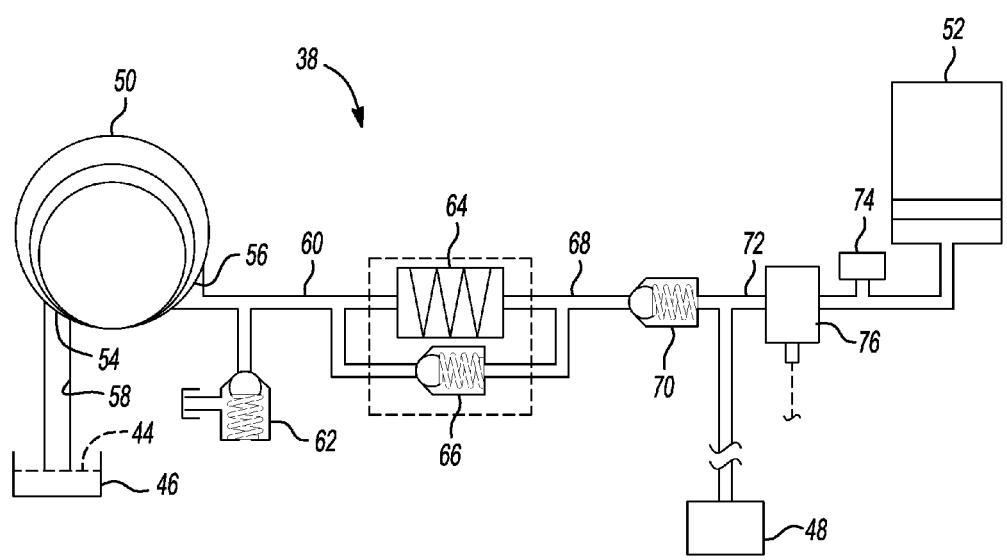
FIG. 2 is a schematic diagram of a portion of an exemplary hydraulic control system.

Turning to FIG. 2, a portion of the hydraulic control system 38 is illustrated. At the outset it should be appreciated that the portion of the hydraulic control system 38 shown in FIG. 2 is exemplary and that other configurations may be employed. The hydraulic control system 38 is operable to selectively engage the clutches/brakes 34 by selectively communicating a hydraulic fluid 44 from a sump 46 to a plurality of shift actuating devices 48. The hydraulic fluid 44 is communicated to the shift actuating devices 48 under pressure from either an engine driven pump 50 or an accumulator 52.

The sump 46 is a tank or reservoir to which the hydraulic fluid 44 returns and collects from various components and regions of the automatic transmission 14. The hydraulic fluid 44 is forced from the sump 46 and communicated throughout the hydraulic control system 38 via the pump 50. The pump 50 may be, for example, a gear pump, a vane pump, a gerotor pump, or any other positive displacement pump. The pump 50 includes an inlet port 54 and an outlet port 56. The inlet port 54 communicates with the sump 46 via a suction line 58. The outlet port 56 communicates pressurized hydraulic fluid 44 to a supply line 60. The supply line 60 is in communication with a spring biased blow-off safety valve 62, an optional pressure side filter 64, and an optional spring biased check valve 66. The spring biased blow-off safety valve 62 communicates with the sump 46. The spring biased blow-off safety valve 62 is set at a relatively high predetermined pressure and if the pressure of the hydraulic fluid 44 in the supply line 60 exceeds this pressure, the safety valve 62 opens momentarily to relieve and reduce the pressure of the hydraulic fluid 44. The pressure side filter 64 is disposed in parallel with the spring biased check valve 66. If the pressure side filter 64 becomes blocked or partially blocked, pressure within supply line 60 increases and opens the spring biased check valve 66 in order to allow the hydraulic fluid 44 to bypass the pressure side filter 64.

The pressure side filter 64 and the spring biased check valve 66 each communicate with an outlet line 68. The outlet line 68 is in communication with a second check valve 70. The second check valve 70 is in communication with a main supply line 72 and is configured to maintain hydraulic pressure within the main supply line 72. The main supply line 72 supplies pressurized hydraulic fluid to a control device 76. The control device 76 is electrically controlled by the control module 36 and is operable to control whether the accumulator 52 is charged or discharged. When the control device 76 is open, the accumulator 52 may charge or discharge depending on whether the main supply line pressure is higher or lower than the accumulator pressure, respectively. When the control device 76 is closed, the accumulator 52 remains charged. The control device 76 may be an on/off solenoid or a pressure or flow control solenoid. Alternatively, an optional check ball valve (not shown) may be disposed parallel to the control device 76 and configured to maintain hydraulic pressure within the accumulator 52. The optional check ball valve allows the accumulator 52 to charge even when the control device 76 is closed if the main supply line pressure 72 is higher than the accumulator pressure. When the control device 76 is open, the accumulator 52 may charge or discharge as previously mentioned.

The main supply line 72 communicates through a hydraulic circuit that may include other control devices, valves, etc., to the plurality of actuating devices 48. The actuating devices 48 may be, for example, piston assemblies that when engaged in turn engage the clutches/brakes 34.

The control device 76 communicates with the accumulator 52 and a pressure sensor 74. The accumulator 52 is an energy storage device in which the non-compressible hydraulic fluid 44 is held under pressure by an external source. In the example provided, the accumulator 52 is a spring type or gas filled type accumulator having a spring or compressible gas or both that provides a compressive force on the hydraulic fluid 44 within the accumulator 52. However, it should be appreciated that the accumulator 52 may be of other types, such as a gas-charged type, without departing from the scope of the present invention. Accordingly, the accumulator 52 is operable to supply pressurized hydraulic fluid 44 back to the main supply line 72. However, upon discharge of the accumulator 52, the second check valve 70 prevents the pressurized hydraulic fluid 44 from returning to the pump 50. The accumulator 52, when charged, effectively replaces the pump 50 as the source of pressurized hydraulic fluid 44, thereby eliminating the need for the pump 50 to run continuously. The pressure sensor 74 reads the pressure of the hydraulic fluid 44 within the accumulator 52 or the main supply line 72 in real time and provides this data to the control module 36. Other types of sensors, such as volume or position sensors, may also be included.

Figure 3:
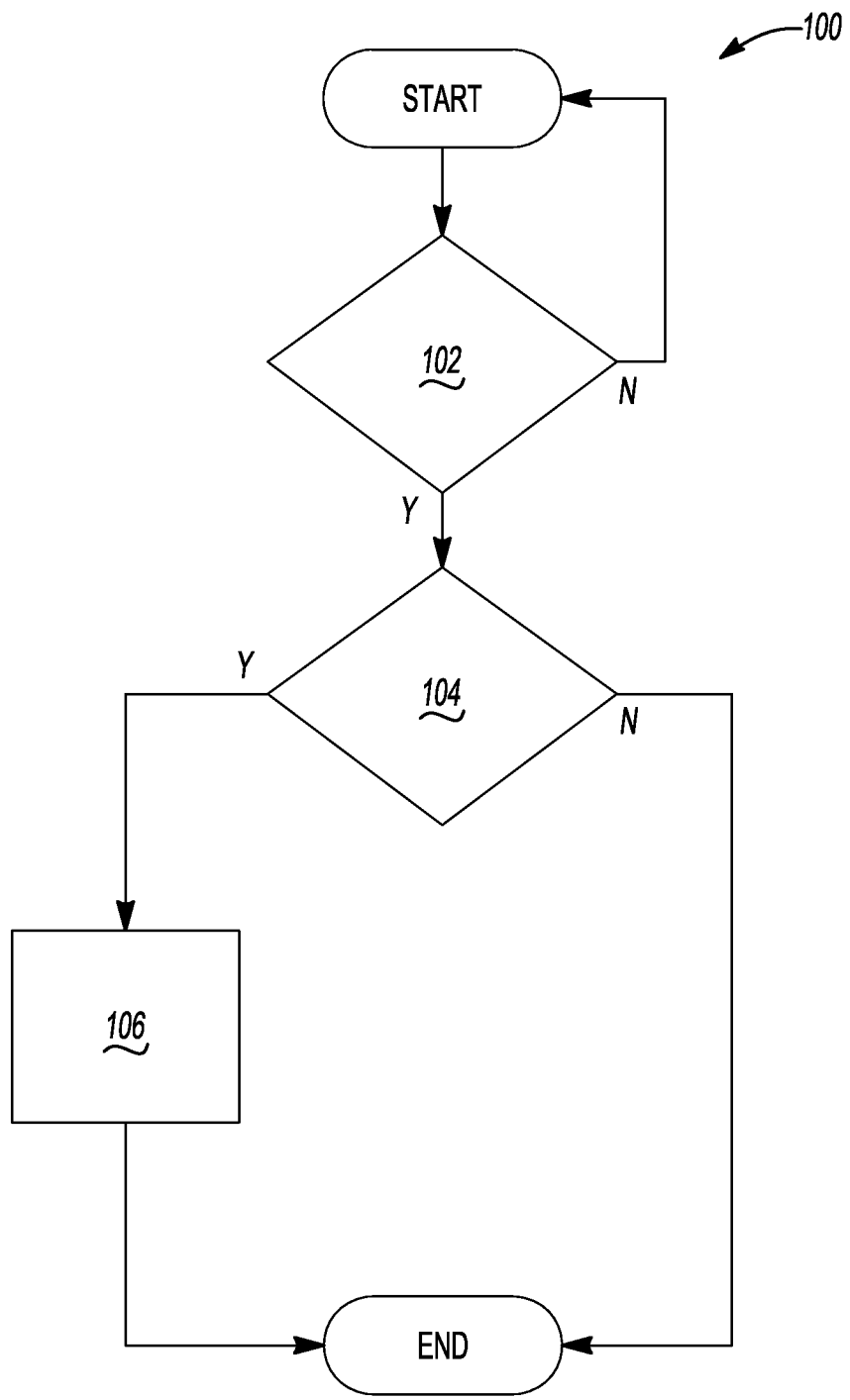
FIG. 3 is a flow chart illustrating a method of operating the motor vehicle of FIGS. 1-2 according to the principles of the present invention.

With reference to FIG. 3, and with continued reference to FIGS. 1 and 2, a method 100 for operating the motor vehicle 5 will now be described. The method 100 is used to determine when to discharge the accumulator 52 based on the state of the motor vehicle 5. For example, the method 100 begins at step 102 where the control module 36 determines whether a controller shutdown sequence has been activated. The controller shutdown sequence begins after a key-off event. A key-off event occurs when an operator of a motor vehicle turns off or otherwise commands the motor vehicle 5 to shut down. If the shutdown sequence has not been activated the method 100 starts over. If the shutdown sequence has been activated (i.e. the motor vehicle 5 has been keyed off), the method 100 proceeds to step 104.

At step 104 the controller 36 performs one or more multiple processes (i.e. executes one or more control logic) to determine whether to discharge the accumulator 52. In a first exemplary process the controller 36 compares the temperature of the automatic transmission fluid (ATF) sensed by the sensor 37B to an ATF range defined by lower and upper ATF temperature thresholds. In a second exemplary process the controller 36 compares the temperature of the ambient air sensed by the sensor 37A to an ambient temperature range defined by lower and upper ambient temperature thresholds. In a third exemplary process the controller 36 compares the pressure of the ATF within the accumulator 52 sensed by the pressure sensor 74 to a pressure range defined by lower and upper pressure thresholds. In a fourth exemplary process the controller 36 determines a time since the key-off event occurred. The key-off event is sensed by the key sensor 37C. The controller 36 then compares the time since key-off event to a time threshold. These processes may be used individually or in combination to determine if the accumulator 52 should be discharged. For example, if the sensed ATF temperature is outside the ATF temperature range, and/or the sensed ambient temperature is outside the ambient temperature range, and/or the sensed ATF pressure is outside the pressure range, and/or the time since key off is less than the time threshold, then the method 100 ends and the accumulator 52 is not discharged. If, however, the sensed ATF temperature is within the ATF temperature range, and/or the sensed ambient temperature is within the ambient temperature range, and/or the sensed ATF pressure is within the pressure range, and/or the time since key off is greater than the time threshold, then the method 100 proceeds to step 106. At step 106 the controller 36 commands the accumulator 52 to discharge and the method 100 ends.

Figure 4:
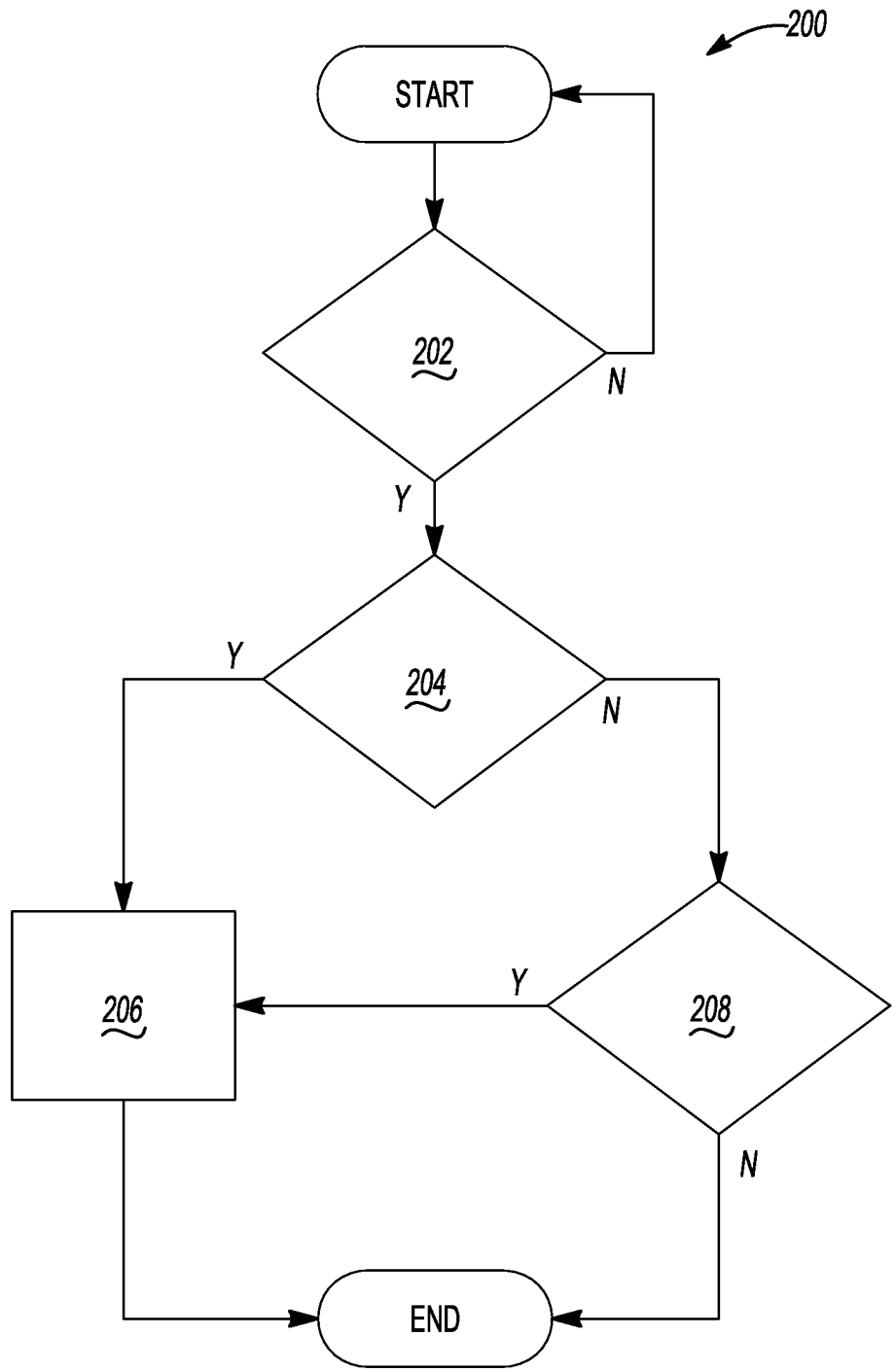
FIG. 4 is a flow chart illustrating another method of operating the motor vehicle of FIGS. 1-2 according to the principles of the present invention.

Turning to FIG. 4, and with continued reference to FIGS. 1 and 2, another method 200 for operating the motor vehicle 5 will now be described. The method 200 may be used concurrently with the method 100 described above. The method 200 is used to determine when to discharge the accumulator 52 based on the state of the motor vehicle 5. For example, the method 200 begins at step 202 where the control module 36 determines whether a controller shutdown sequence has been activated. The controller shutdown sequence begins after a key-off event. A key-off event occurs when an operator of a motor vehicle turns off or otherwise commands the motor vehicle 5 to shut down. If the shutdown sequence has not been activated the method 200 starts over. If the shutdown sequence has been activated (i.e. the motor vehicle 5 has been keyed off), the method 200 proceeds to step 204.

At step 204 the controller 36 determines whether the accumulator 52 should be discharged based on whether the motor vehicle 5 is to be served. The controller 36 determines whether the motor vehicle 5 is being serviced based one or more inputs received by the controller 36. For example, the controller 36 can receive a CAN message indicating that the motor vehicle will be serviced. This CAN message may be generated from a computer/device that a technician uses to read motor vehicle error codes. Alternatively, the CAN message may be generated from a change in various motor vehicle calibration values. If the controller 36 determines that the motor vehicle 5 is being serviced the method 200 proceeds to step 206. At step 206 the controller 36 commands the accumulator 52 to discharge and the method 200 ends. If the controller 36 determines that the motor vehicle 5 is not being serviced the method proceeds to step 208.

At step 208 the controller 36 determines whether one or more error codes have been generated by the controller 36. One example of an error code includes a loss of communication with the controller 36 or body module or a combination of communication failures. Another example of an error code includes detecting a failed accumulator discharge which may indicate that the control device 76 may be malfunctioning. This would therefore indicate a need to relieve the pressure of the accumulator 52. If the error codes are not generated the method 200 ends. If the error codes are generated then the method 200 proceeds to step 206 where the controller 36 commands the accumulator 52 to discharge and the method 200 ends.

The description of the invention is merely exemplary in nature and variations that do not depart from the gist of the invention are intended to be within the scope of the invention. Such variations are not to be regarded as a departure from the spirit and scope of the invention.

The following is claimed:

1. A method for controlling an accumulator in a transmission of a motor vehicle, the method comprising:
   determining whether the motor vehicle has been turned off;
   sensing at least one operating condition of the motor vehicle;
   comparing the at least one operating condition to a reference condition, wherein the reference condition is defined by a lower threshold and an upper threshold;
   discharging the accumulator if the motor vehicle has been turned off and if the at least one operating condition of the motor vehicle is between the lower threshold and the upper threshold of the reference condition.

2. The method of claim 1 wherein the at least one operating condition is a temperature of a hydraulic fluid within the transmission, and the reference condition is a temperature range defined by the lower threshold and the upper threshold.

3. The method of claim 1 wherein the at least one operating condition is a temperature of ambient air, and the reference condition is a temperature range defined by the lower threshold and the upper threshold.

4. The method of claim 1 wherein the at least one operating condition is a pressure of a hydraulic fluid within the transmission, and the reference condition is a pressure range defined by the lower threshold and the upper threshold.

5. The method of claim 1 wherein the at least one operating condition is a time value measured from a key off event, and the reference condition is a time range defined by the lower threshold and the upper threshold.

6. The method of claim 1 wherein determining whether the motor vehicle has been turned off includes sensing a key off event by an operator of the motor vehicle.

7. A method for controlling an accumulator in a transmission of a motor vehicle, the method comprising:
   determining whether the motor vehicle has been turned off;
   sensing a temperature of a hydraulic fluid within the transmission,
   sensing a temperature of ambient air,
   sensing a time value measured from a key off event;
   comparing the sensed temperature of the hydraulic fluid to a hydraulic fluid temperature range defined by a lower fluid temperature threshold and an upper fluid temperature threshold;
   comparing the sensed temperature of the ambient air to an ambient temperature range defined by a lower ambient temperature threshold and an upper ambient temperature threshold;
   comparing the time value to a time threshold; and
   discharging the accumulator if the motor vehicle has been turned off and if the sensed hydraulic fluid temperature is within the hydraulic fluid temperature range, or the sensed ambient temperature is within the ambient temperature range, or the time value is greater than the time threshold.

8. The method of claim 7 wherein determining whether the motor vehicle has been turned off includes sensing a key off event by an operator of the motor vehicle.

9. The method of claim 7 further comprising sensing a pressure of the hydraulic fluid within the transmission, comparing the sensed pressure of the hydraulic fluid to a pressure range defined by a lower pressure threshold and an upper pressure threshold, and discharging the accumulator if the motor vehicle has been turned off and if the sensed hydraulic fluid pressure is within the pressure range.

10. The method of claim 9 wherein sensing the pressure of the hydraulic fluid within the transmission includes sensing a pressure of the hydraulic fluid within the accumulator in the transmission.

11. A method for controlling an accumulator in a transmission of a motor vehicle, the method comprising:
    determining whether the motor vehicle has been turned off;
    sensing at least one operating condition of the motor vehicle;
    comparing the at least one operating condition to a reference condition;
    discharging the accumulator if the motor vehicle has been turned off and if the at least one operating condition of the motor vehicle fulfills the reference condition;
    determining whether any error codes have been generated if the at least one operating condition of the motor vehicle does not fulfill the reference condition; and
    discharging the accumulator if the motor vehicle has been turned off and if the error codes have been generated.

12. The method of claim 11 wherein the at least one operating condition is one or more sensed conditions of the motor vehicle, and the reference condition is one or more conditions indicative of service being performed on the motor vehicle.

13. The method of claim 11 wherein the error codes include a signal indicating a loss of communication with one or more modules of the motor vehicle.

14. The method of claim 11 wherein determining whether the motor vehicle has been turned off includes sensing a key off event by an operator of the motor vehicle.

* * * * *